United States Patent [19]
Eder

[11] Patent Number: 6,112,687
[45] Date of Patent: Sep. 5, 2000

[54] SHIP HULL

[76] Inventor: Theodor Eder, Herzogbergstrasse 149, A-2380 Perchtoldsdorf, Austria

[21] Appl. No.: 09/294,479

[22] Filed: Apr. 20, 1999

[51] Int. Cl.⁷ ........................................................ B63B 1/00
[52] U.S. Cl. ............................................................ 114/61.2
[58] Field of Search .............................. 114/61.26, 61.32, 114/62, 63, 61.33, 61.2, 121, 125, 288

[56] References Cited

U.S. PATENT DOCUMENTS

| | | |
|---|---|---|
| 25,198 | 8/1859 | Hirsch . |
| 187,742 | 2/1877 | Whiting . |
| 793,944 | 7/1905 | Manker . |
| 3,698,342 | 10/1972 | Jackson . |
| 3,698,345 | 10/1972 | Kreitner ................................. 114/125 |
| 3,822,661 | 7/1974 | Simpson . |
| 4,357,890 | 11/1982 | Anderson ............................... 114/123 |
| 4,672,905 | 6/1987 | Pipkorn . |
| 4,870,919 | 10/1989 | Allison . |
| 4,899,679 | 2/1990 | Immonen ............................... 114/39.1 |
| 5,211,126 | 5/1993 | Johnson . |
| 5,402,743 | 4/1995 | Holderman . |
| 5,499,593 | 3/1996 | Raab ..................................... 114/271 |

FOREIGN PATENT DOCUMENTS

| | | |
|---|---|---|
| 458188 | 2/1973 | Australia . |
| 0 298 050 | 1/1989 | European Pat. Off. . |
| 2502104 | of 1981 | France . |
| 9193884 | of 1996 | France . |
| 28 12616A1 | of 1978 | Germany . |
| 36 39 175 | 5/1988 | Germany . |
| 41 25 187 | 2/1993 | Germany . |
| 19847861 | of 1998 | Germany . |
| 776000 | 5/1957 | United Kingdom . |
| WO/9509102 | of 1994 | WIPO . |

OTHER PUBLICATIONS

European Patent Office, Patent Abstract of Japan, No. 9–193884.

*Primary Examiner*—S. Joseph Morano
*Assistant Examiner*—Patrick Craig Muldoon
*Attorney, Agent, or Firm*—McAulay Nissen Goldberg & Kiel, LLP

[57] ABSTRACT

A ship hull comprises at least one longitudinally directed displacement body which is symmetric to the longitudinal axis of the ship and which is adjoined by gliding surfaces at least at both longitudinal sides or, as the case may be, on all sides, being provided at the underside of the hull. The quantity of water displaced by the displacement body substantially corresponds, with respect to weight, to the total weight of the ship, so that the gliding surface lies substantially horizontally and on or in the vicinity of the surface of the water. The gliding surfaces are constructed in a wave-shaped manner in the longitudinal direction and, as the case may be, also in the transverse direction of the ship hull, wherein the wave shape of the gliding surfaces is displaced by approximately 180° relative to the natural waves generated by the displacement body, so that the natural waves are virtually canceled during travel through the water.

4 Claims, 4 Drawing Sheets

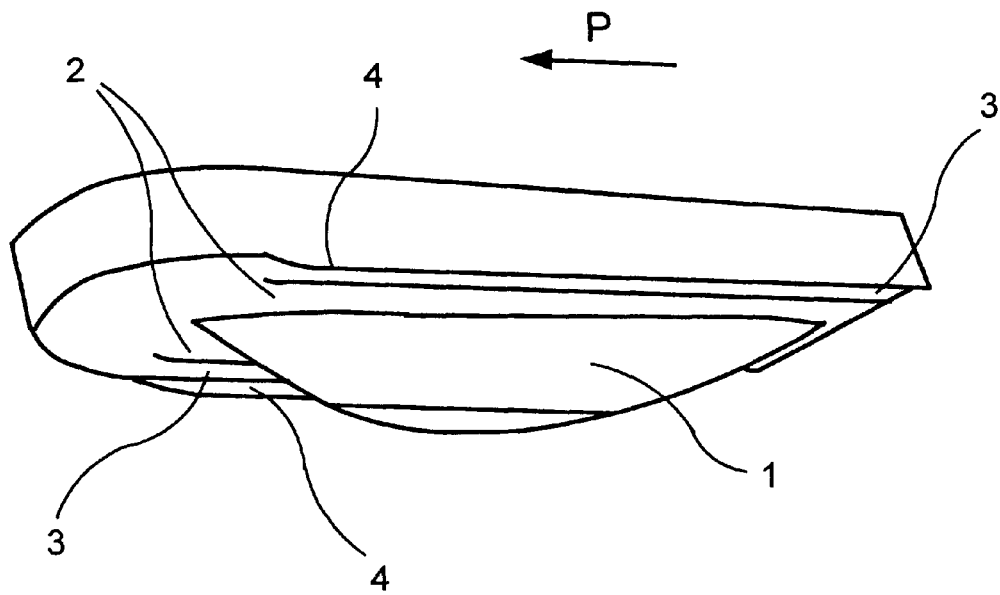
F I G. 1
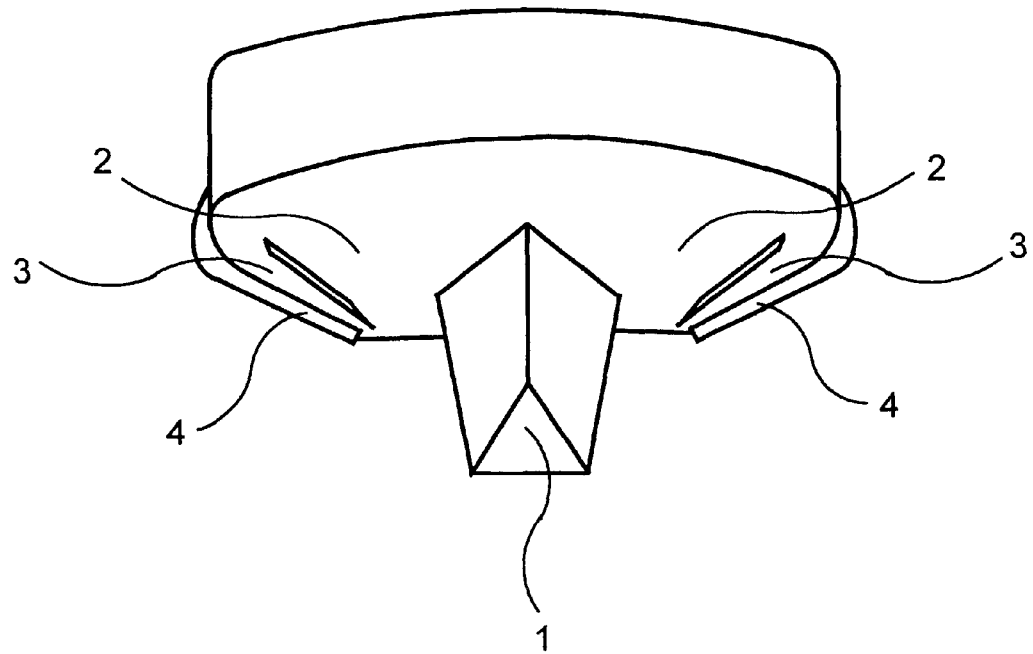
F I G. 2

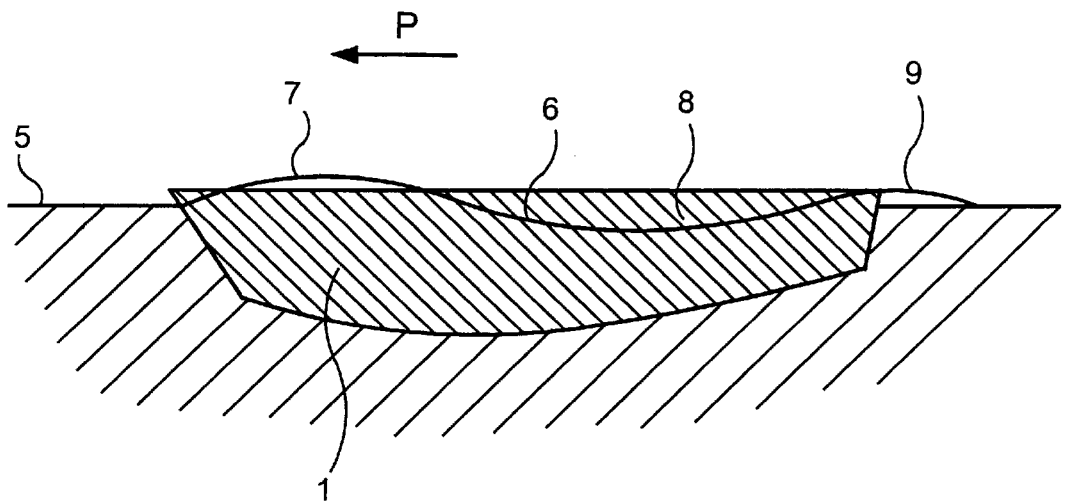
F I G. 6
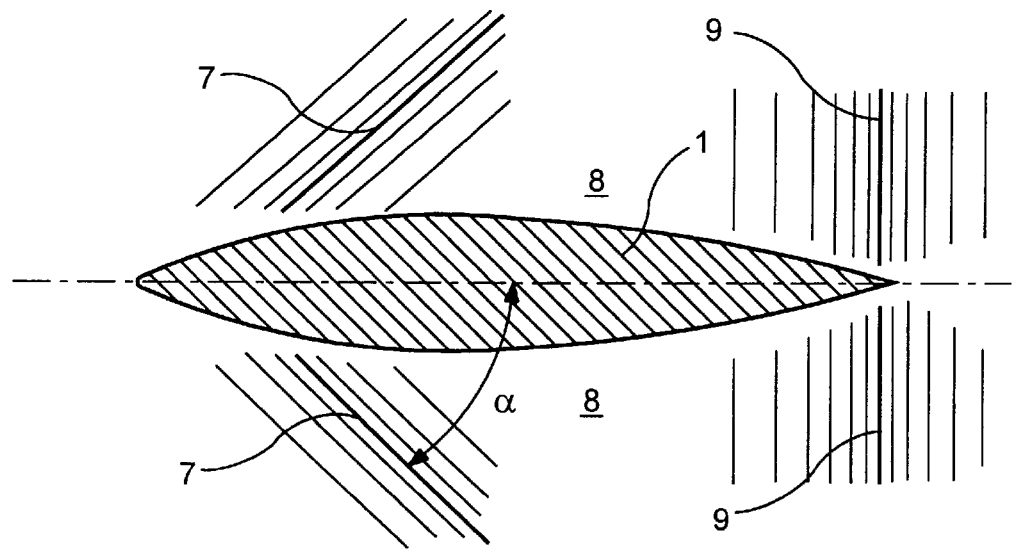
F I G. 7

SHIP HULL

BACKGROUND OF THE INVENTION a) Field of the Invention

The invention relates to a ship hull, at least one longitudinally directed displacement body which is symmetric to the longitudinal axis of the ship and which is adjoined by gliding surfaces at least at both longitudinal sides or, as the case may be, on all sides, being provided at the underside of the hull, wherein the quantity of water displaced by the displacement body substantially corresponds, with respect to weight, to the total weight of the ship, so that the gliding surfaces lie substantially horizontally and on or in the vicinity of the surface of the water.

b) Description of the Related Art

In a hull of the type mentioned above, it was known (U.S. Pat. No. 3,698,342 A) to construct the gliding surfaces as flat surfaces. However, essentially the usual development of waves takes place when the ship travels through the water, without any special effect being achieved.

Not only does the wave formation consume driving energy, but damage to embankments or shoreline structures results especially when the ship travels in built up areas. Where buildings are concerned, well-known damages result (Venice).

OBJECT AND SUMMARY OF THE INVENTION

It is one of the objects of the invention to overcome the problems described above. According to the invention, this object is met in a ship hull of the type mentioned above when the gliding surfaces are constructed in a wave-shaped manner in the longitudinal direction and, as the case may be, also in the transverse direction of the ship hull, wherein the wave shape of the gliding surfaces is displaced by approximately 180° relative to the natural waves generated by the displacement body, so that the natural waves of the displacement body are virtually canceled during travel through the water.

Due to the construction of the gliding surfaces of the ship hull according to the invention, the wave formation and therefore the drawbacks resulting therefrom can be prevented or eliminated. In particular, there is a considerable savings in driving energy for the entire ship.

In this connection, it must be taken into account that when the ship is traveling through calm water it must overcome essentially three counterforces. The least of these counterforces is wind resistance, the next strongest is the frictional resistance of the submerged or underwater surface, and the most important is the form resistance given by the respective construction of the underwater hull. This form resistance or residuary resistance is composed of the wave resistance, the pressure resistance and the inductive resistance, wherein the latter is caused by leeway and is small.

As is well known, a displacing, non-gliding hull forms waves when traveling through the water, which uses up energy. At low speed, the length of the wave is initially small (which can usually be seen quite clearly at the ship's side) and increases as the speed increases until it is finally equal to the waterline length of the ship. From that point, the resistance of a displacing body increases enormously.

The invention is based on the following idea: initially without consideration to the desired width of the ship, the ship hull should comprise a longitudinally directed part which is as streamline-shaped as possible, which has low resistance in itself and whose volume corresponds to the total displacement of the ship. In or in the vicinity of the waterline of the ship, essentially horizontal gliding surfaces adjoin this displacement body on the left and right sides as well as somewhat toward the front and the rear.

Parallel shoulders which extend vertically downward and which are narrow in comparison to the depth of the displacement body can be located at the outer edges.

Naturally, the underwater hull can also be formed of a plurality of displacement bodies of this kind, wherein the gliding surfaces are located between these displacement bodies and at the outer edges thereof.

Considered by itself, that is, without the gliding surfaces, the displacement body forms waves of determined length, depending on speed, when traveling through the water. The adjoining gliding surfaces are shaped in a wave-shaped manner in the longitudinal direction and, as the case may be, in the transverse direction according to the invention in such a way that the waves of the displacement body are canceled by their influence and, also, no further waves occur.

Drag tests with ship models constructed in accordance with the invention showed, for example, that a wave of the gliding surfaces which has only a small depth relative to the depth of the displacement body and which is displaced by about 180° relative to the natural waves of the displacement body in the longitudinal direction has favorable results as regards the object of the invention. Subsequent extrapolations of the drag test with three different models on ships of corresponding size, all of which have a length of 14 m, a width of 4.5 m and a displacement of 21 tons, gave the following necessary drag power at a traveling speed of 25 km per hour:

| | |
|---|---|
| boat (DG boat) constructed according to the invention | 11 kW |
| conventional gliding boat or hydroplane | 197 kW |
| conventional displacement boat | 245 kW |

Many utility or commercial craft (fishing boats, etc) normally move in these speed ranges.

Naturally, the construction of the hull in accordance with the invention has a greater surface and consequently a higher frictional resistance compared with almost any other conventional ship shape. Nevertheless, the total resistance is much lower, so that driving energy can be saved.

In order to reduce the frictional resistance, the following measures may be taken in addition:

As was stated above, narrow, vertically extending longitudinal shoulders are mounted at the parallel side edges of the underwater hull, wherein these longitudinal shoulders are submerged in the water only slightly and thus prevent lateral spray or splash water and increase the directional stability of the ship. This also enables a purposeful injection of compressed air by means of nozzles which are located in the front part of the gliding surfaces in order to prevent the frictional resistance of the gliding surfaces by breaking up the interface between the water and gliding surfaces.

To summarize, the invention has the following advantages over all previous underwater shapes of ships:

1. Substantially smaller total resistance when traveling through water at all speeds compared with conventional displacement boats.

2. Substantially lower total resistance when traveling through water compared with conventional gliding boats or hydroplanes in the speed range before hydroplaning.

3. Virtually no wave formation when traveling through the water, protection of bank and buildings on water as, e.g., in Venice.

In a special construction of the hull according to the invention, this hull can be provided with compensation tanks to compensate for weight variations of the ship.

The invention will be explained more fully hereinafter with reference to the drawings.

BRIEF DESCRIPTION OF THE DRAWINGS

In the drawings:

FIG. 1 shows a schematic representation of a hull according to the invention in a side view;

FIG. 2 shows the same, also schematically in a front view;

FIG. 6 is a longitudinal section through a displacement body with generated wave formation;

FIG. 7 is a top view of the displacement body of FIG. 6;

DESCRIPTION OF THE PREFERRED EMBODIMENTS

Figure 3:
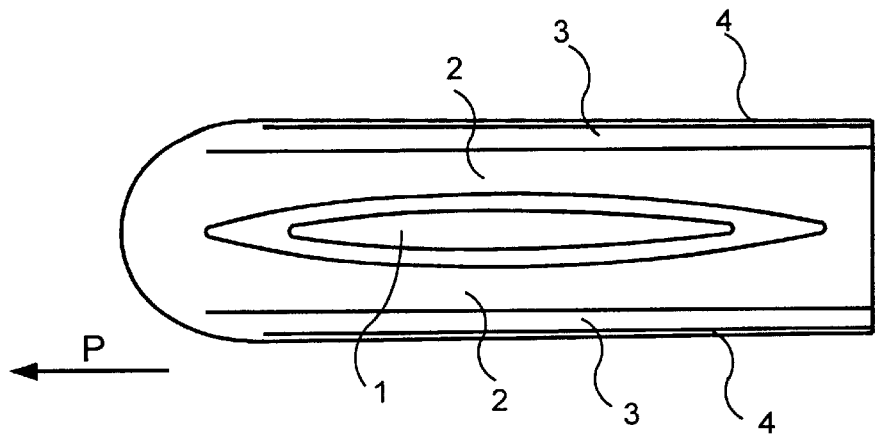
FIG. 3 shows the same in a bottom view.
Figure 4:
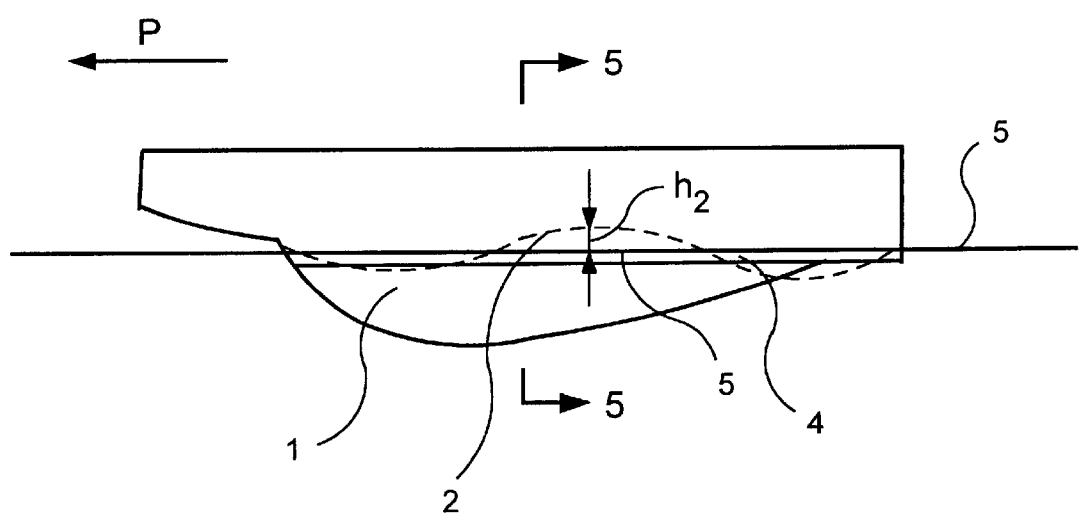
FIG. 4 shows the same in a side view.
Figure 5:
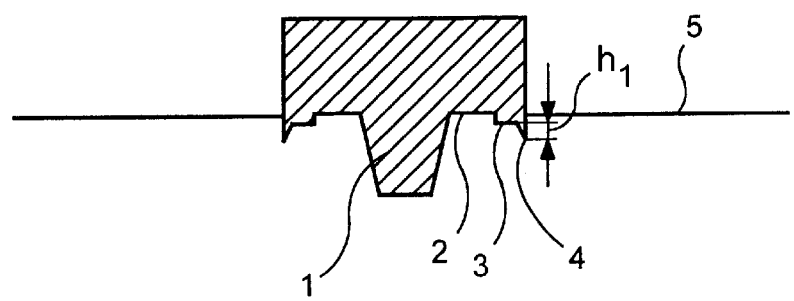
FIG. 5 is a section along line X-Y from FIG. 4.

The displacement body is designated by 1 in the drawing. Gliding surfaces 2 with waves in the longitudinal direction and/or transverse direction adjoin the displacement body 1 laterally, wherein the wave-shaped construction in the longitudinal direction is shown most clearly by the dashed lines in FIGS. 4 and 8. In some cases, every gliding surface 2 can pass externally into gliding strips 3 which are shaped so as to be flat. If required, shoulders 4 whose height h1 is approximately equal to the wave amplitude h2 of the lateral gliding surfaces 2 can also project downward from the outer edge of the gliding strips 3. In the drawing, the waterline is designated by 5 and the arrow P designates the traveling direction. Longitudinal chambers which are closed laterally and on top are formed underwater between the shoulders 4 and the displacement body 1, wherein air can be injected into these longitudinal chambers in the front through nozzles and is then retained along the entire length of the ship while traveling through the water so as to prevent friction through the breaking up of the interface or boundary layer. The gliding surfaces 2 and 3 should lie on the surface of the water as far as possible which, if necessary, can be ensured by means of compensation tanks.

FIGS. 6 and 7 only show the displacement body 1 of the underwater hull with the wave pattern generated by the displacement body 1 while traveling (traveling direction P) through the water, wherein the generated natural wave 6 is shown in FIG. 6 in longitudinal section. A first wave crest 7 extends diagonally outward and to the rear at an angle α (FIG. 7) relative to the longitudinal axis of the underwater hull. After a wave trough 8, a subsequent second wave crest 9 is shown by way of example.

Figure 8:
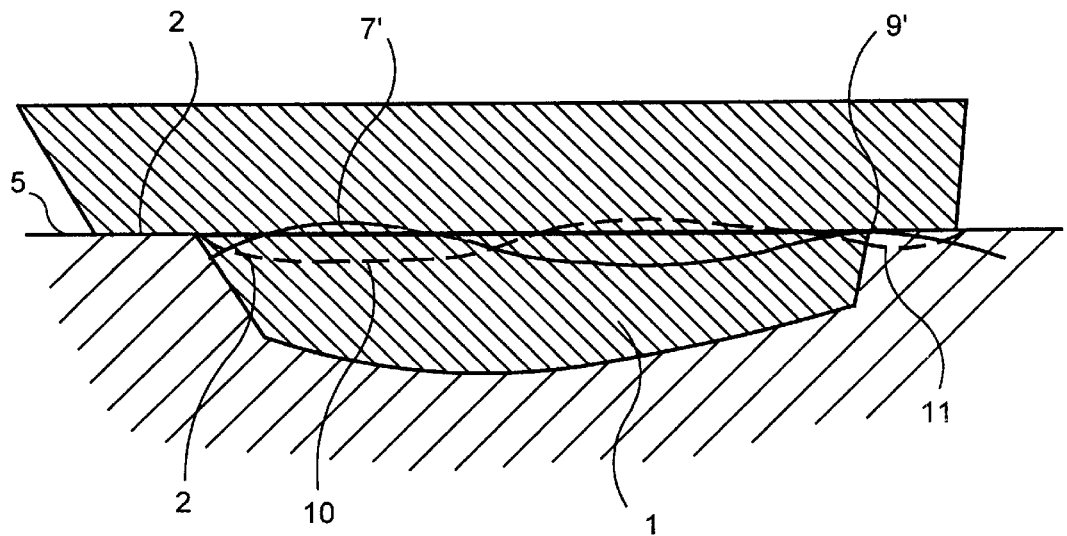
FIG. 8 is a longitudinal section through a hull with displacement body.
Figure 9:
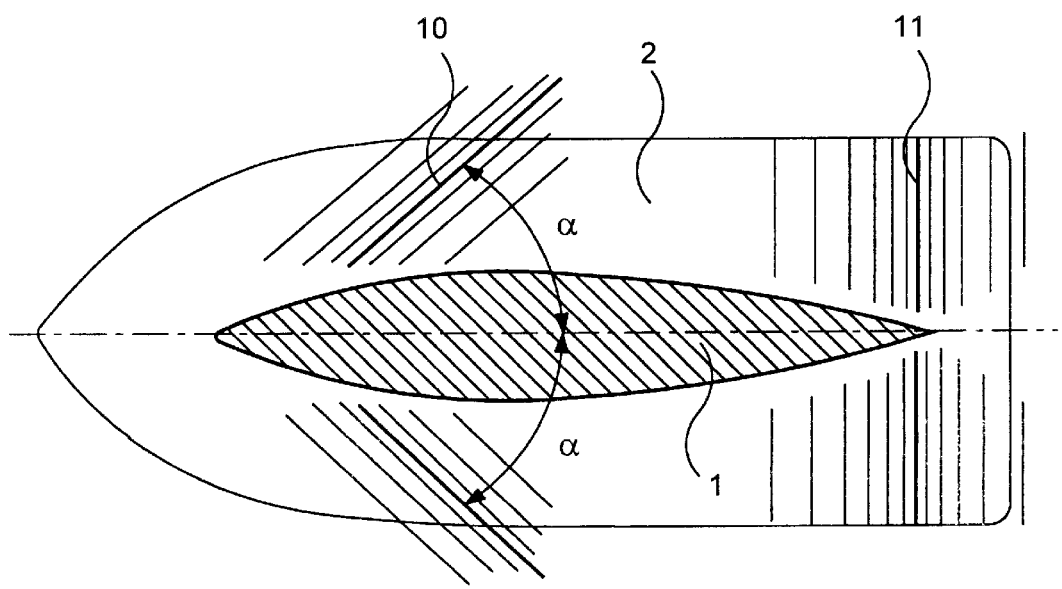
FIG. 9 is a bottom view of the hull with displacement body of FIG. 8 with the lateral gliding surfaces.

FIGS. 8 and 9 show the underwater hull with the displacement body 1 and the gliding surfaces 2. The two gliding surfaces 2 on either side of the displacement body 1 have bulging waves 10 and 11 at those locations where the wave crests 7' and 9' are generated by the displacement body 1 by itself and are accordingly constructed in opposite direction thereto or so as to be displaced by 180° in the longitudinal direction. The wave of the gliding surfaces 2 follows the angle α in the transverse direction. A wave formation is extensively prevented by means of this arrangement of the gliding surfaces 2.

While the foregoing description and drawings represent the preferred embodiments of the present invention, it will be obvious to those skilled in the art that various changes and modifications may be made therein without departing from the true spirit and scope of the present invention.

What is claimed is:

1. A ship hull comprising:

a main hull portion;

at least one longitudinally directed displacement body which is symmetric to a longitudinal axis of the ship and which is adjoined by gliding surfaces at least at both longitudinal sides, being provided at the underside of the main hull portion, wherein the quantity of water displaced by the displacement body substantially corresponds, with respect to weight, to the total weight of the ship, so that the gliding surfaces lie substantially horizontally and on or in the vicinity of the surface of the water;

said gliding surfaces being constructed in a wave-shaped manner in at least the longitudinal direction of the ship hull, wherein the wave shape of the gliding surfaces is displaced by approximately 180° relative to the natural waves generated by the displacement body, so that the natural waves of the displacement body are virtually canceled during travel through the water.

2. The ship hull of claim 1, wherein the gliding surfaces are constructed in a wave-shaped manner also in the transverse direction of the ship hull.

3. The ship hull of claim 1, wherein the gliding surfaces are provided on the longitudinal and transverse sides.

4. The ship hull according to claim 1, wherein the ship hull is provided with compensation tanks to compensate for weight variations of the ship.

* * * * *